(12) United States Patent
Lutawan

(10) Patent No.: US 9,481,300 B1
(45) Date of Patent: Nov. 1, 2016

(54) PROXIMITY ALERT SYSTEM

(71) Applicant: Christopher A. Lutawan, New Castle, DE (US)

(72) Inventor: Christopher A. Lutawan, New Castle, DE (US)

( * ) Notice: Subject to any disclaimer, the term of this patent is extended or adjusted under 35 U.S.C. 154(b) by 0 days.

(21) Appl. No.: 14/933,051

(22) Filed: Nov. 5, 2015

(51) Int. Cl.
*B60Q 1/00* (2006.01)
*B60Q 9/00* (2006.01)
*B60R 1/00* (2006.01)
*B60Q 1/26* (2006.01)

(52) U.S. Cl.
CPC ............... *B60Q 9/008* (2013.01); *B60Q 1/26* (2013.01); *B60R 1/00* (2013.01)

(58) Field of Classification Search
CPC .............. B60Q 1/00; B60Q 1/26; B60R 1/00
USPC .......... 340/435, 436, 438, 540, 541; 701/23, 701/36; 438/148
See application file for complete search history.

(56) References Cited

U.S. PATENT DOCUMENTS

| | | |
|---|---|---|
| 5,051,735 A | 9/1991 | Furukawa |
| 5,414,439 A | 5/1995 | Groves et al. |
| 5,574,443 A | 11/1996 | Hsieh |
| 8,412,413 B1 | 4/2013 | Stark et al. |
| 8,482,486 B2 | 7/2013 | Seder et al. |
| 8,593,520 B2 | 11/2013 | Hong et al. |
| 2009/0225434 A1 | 9/2009 | Nicholas et al. |
| 2012/0268582 A1 | 10/2012 | Rothenhausler |
| 2014/0309855 A1* | 10/2014 | Tran ......................... B60Q 1/38 701/36 |
| 2015/0203033 A1* | 7/2015 | Watanabe ................. B60R 1/00 348/148 |
| 2016/0196823 A1* | 7/2016 | Yellambalase .......... G10L 15/22 348/148 |

* cited by examiner

*Primary Examiner* — Tai Nguyen

(57) ABSTRACT

A proximity alert system includes a vehicle that may be driven on a roadway. A proximity alert is coupled to the vehicle and the proximity alert detects obstacles around the vehicle when the vehicle is driven on the roadway. The proximity alert is electrically coupled to the turn signal such that the proximity alert is turned on when the turn signal is actuated. The proximity alert generates an alarm sequence when the turn signal is actuated and the proximity alert detects the obstacle. Thus, the proximity alert alerts a driver of the vehicle to the presence of the obstacles when the vehicle changes lanes on the roadway. The proximity alert generates an all clear sequence when the turn signal is actuated and the proximity alert does not detect the obstacle. Thus, the proximity alert facilitates the driver to safely change lanes on the roadway.

7 Claims, 5 Drawing Sheets

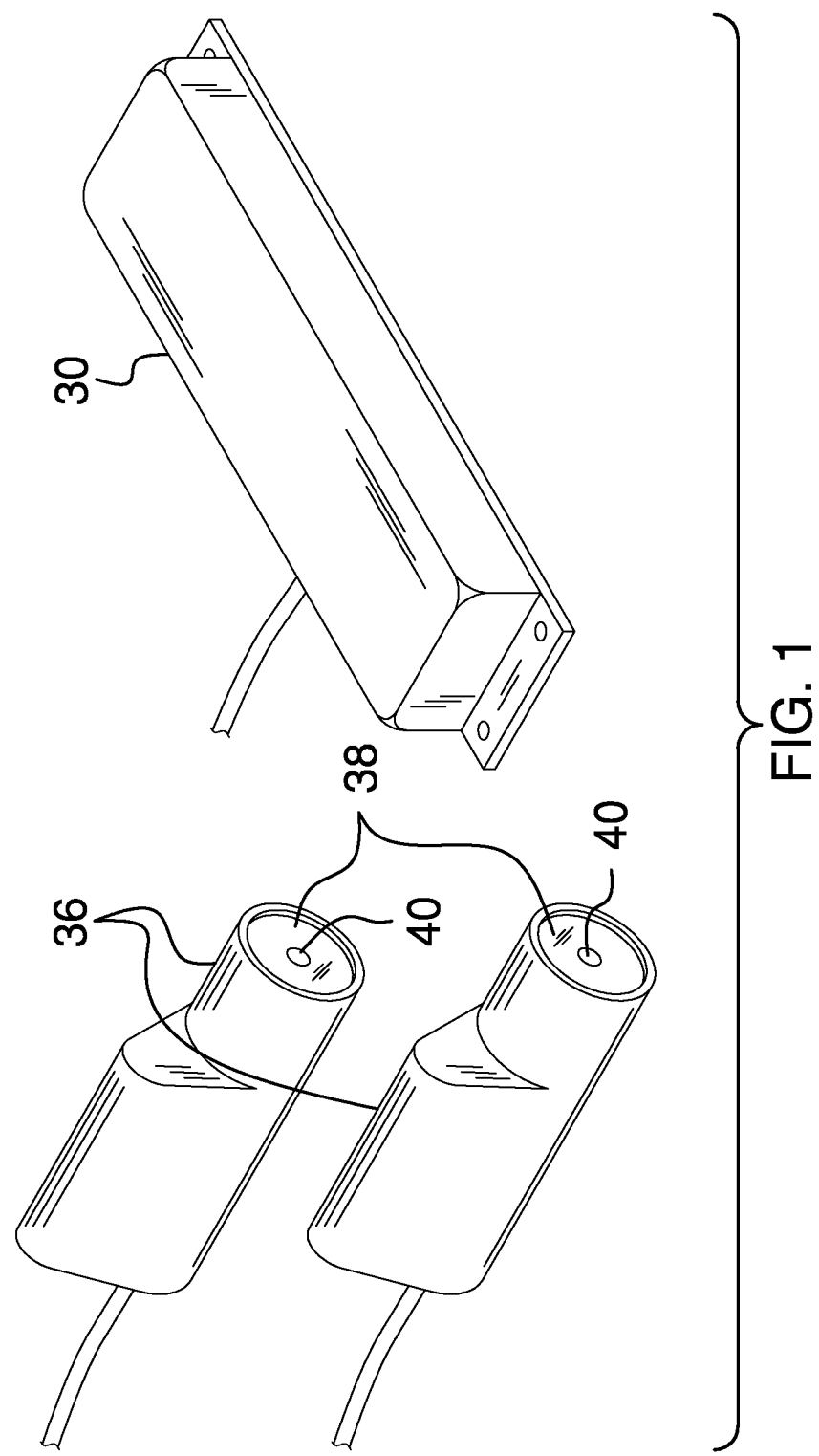

PROXIMITY ALERT SYSTEM

BACKGROUND OF THE DISCLOSURE

Field of the Disclosure

The disclosure relates to alert devices and more particularly pertains to a new alert device for facilitating a driver to safely change lanes on a roadway.

SUMMARY OF THE DISCLOSURE

An embodiment of the disclosure meets the needs presented above by generally comprising a vehicle that may be driven on a roadway. A proximity alert is coupled to the vehicle and the proximity alert detects obstacles around the vehicle when the vehicle is driven on the roadway. The proximity alert is electrically coupled to the turn signal such that the proximity alert is turned on when the turn signal is actuated. The proximity alert generates an alarm sequence when the turn signal is actuated and the proximity alert detects the obstacle. Thus, the proximity alert alerts a driver of the vehicle to the presence of the obstacles when the vehicle changes lanes on the roadway. The proximity alert generates an all clear sequence when the turn signal is actuated and the proximity alert does not detect the obstacle. Thus, the proximity alert facilitates the driver to safely change lanes on the roadway.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a perspective kit view of a proximity alert system according to an embodiment of the disclosure.

DESCRIPTION OF THE PREFERRED EMBODIMENT

Figure 3:
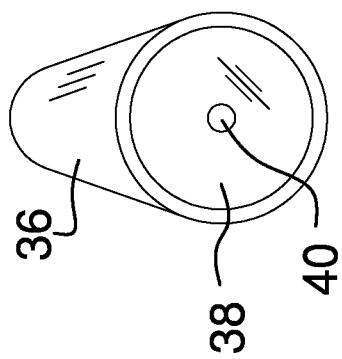
FIG. 3 is a front view of a camera of an embodiment of the disclosure.
Figure 2:
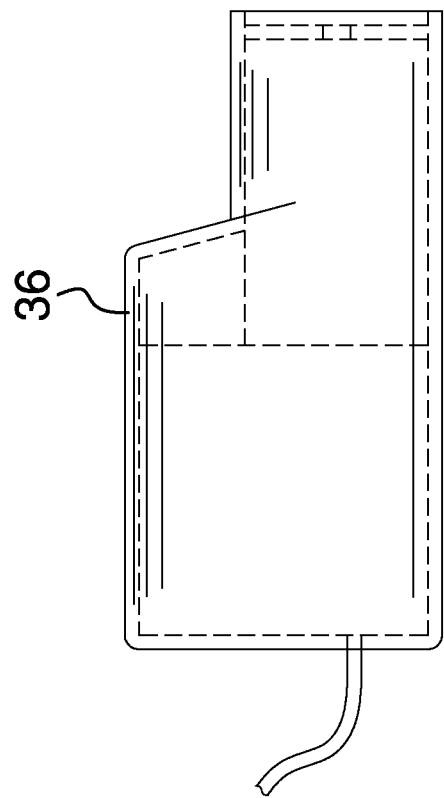
FIG. 2 is a right side view of a camera of an embodiment of the disclosure.
Figure 4:
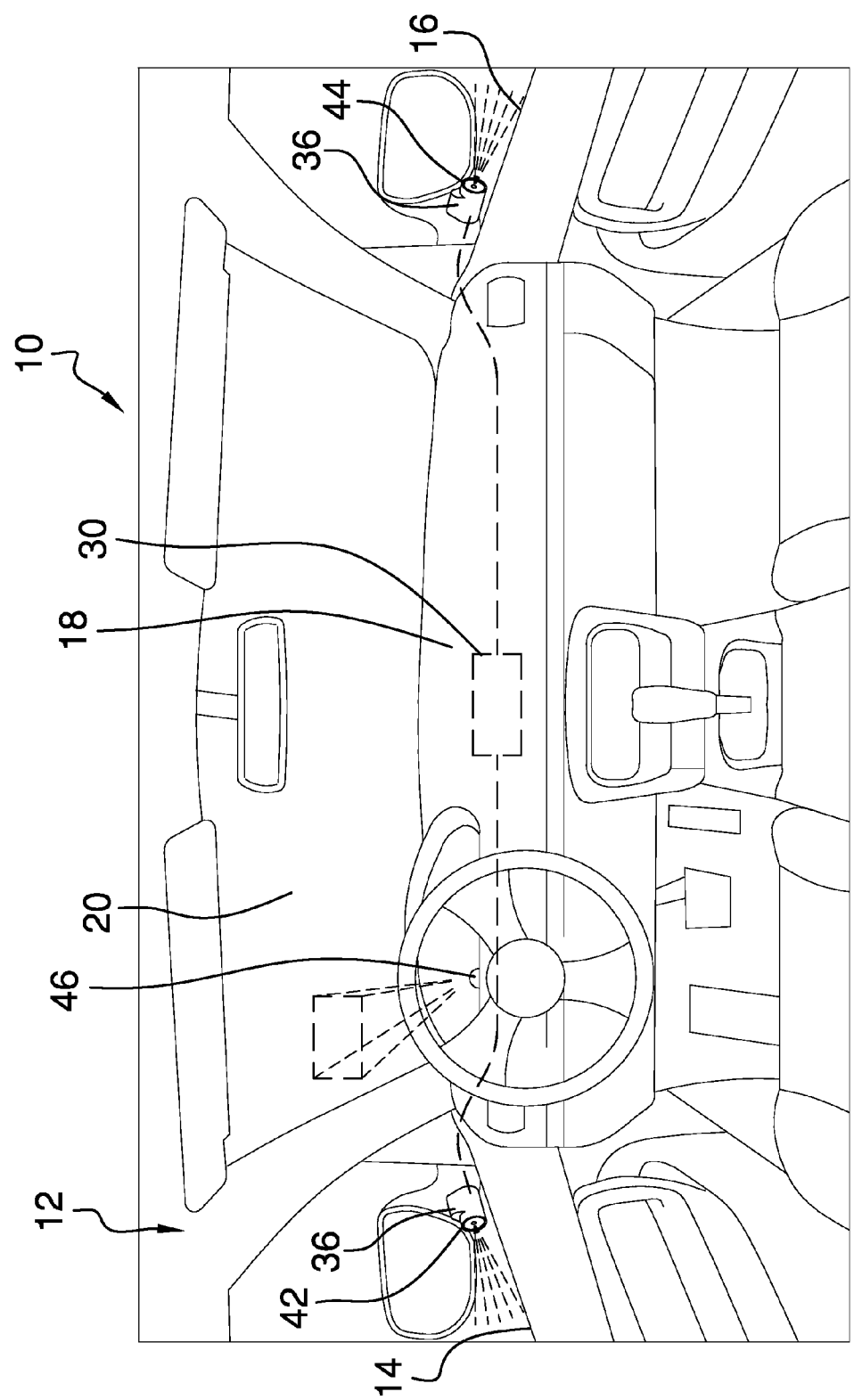
FIG. 4 is a perspective view of an embodiment of the disclosure.
Figure 5:
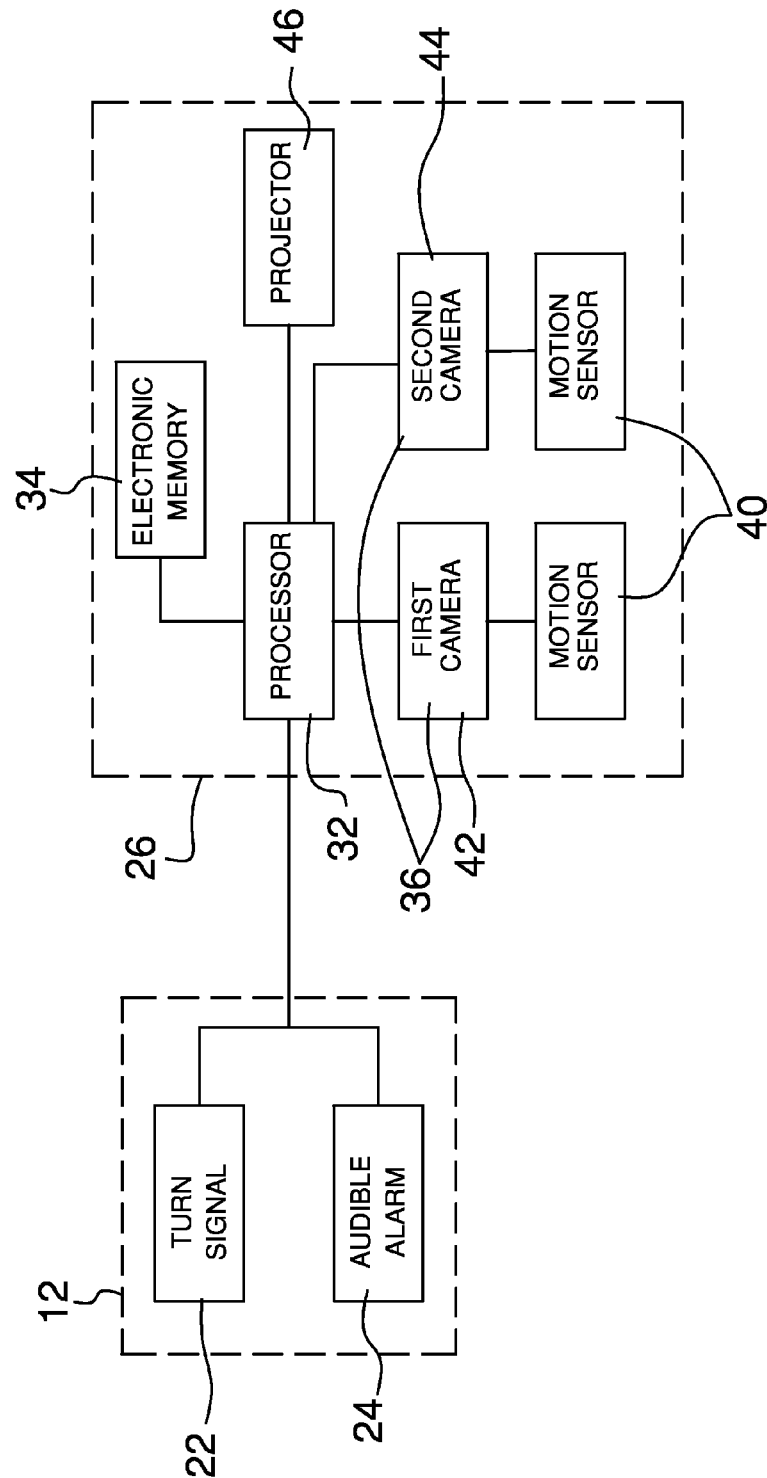
FIG. 5 is a schematic view of an embodiment of the disclosure.
Figure 6:
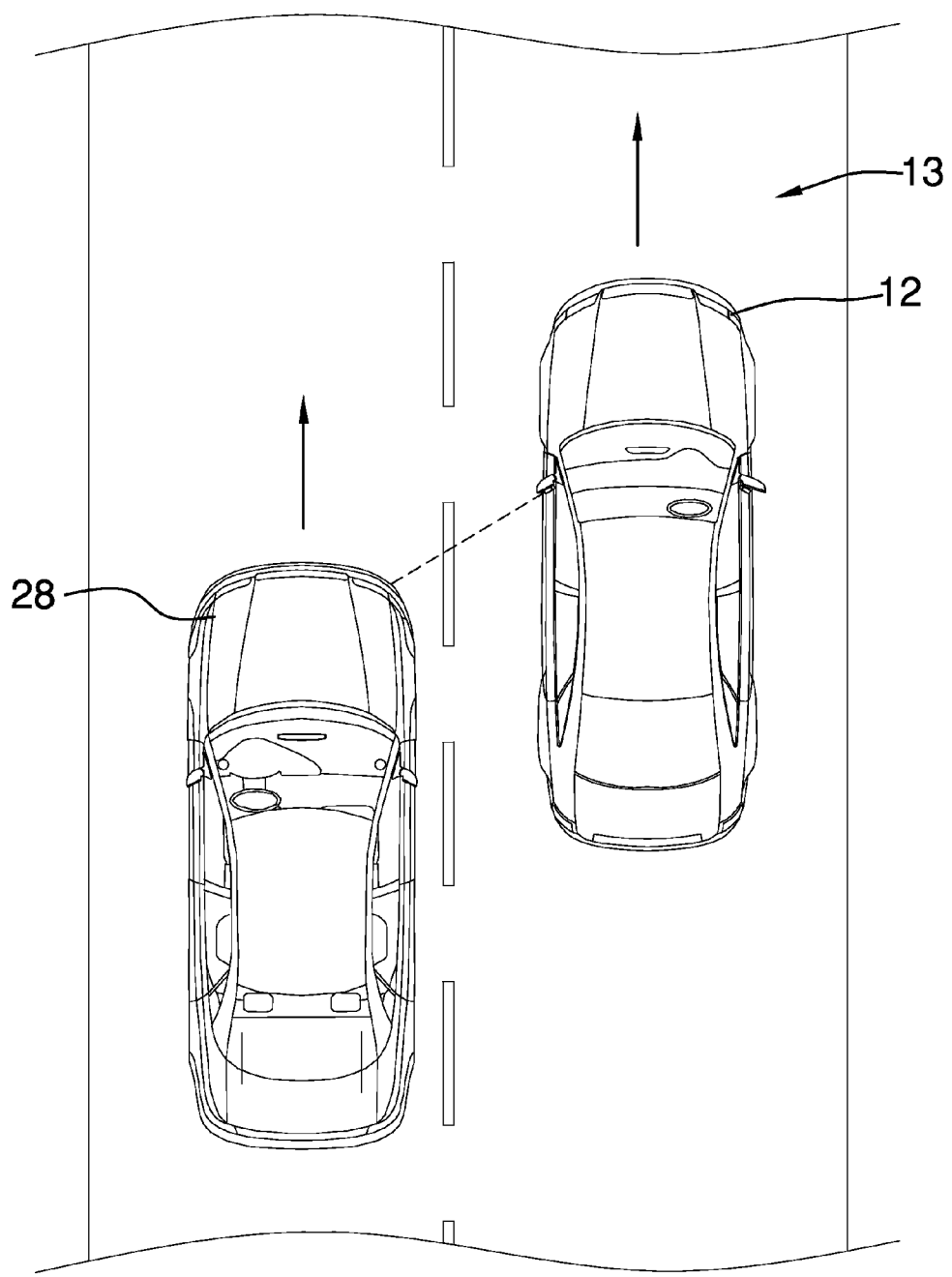
FIG. 6 is a perspective in-use view of an embodiment of the disclosure.

With reference now to the drawings, and in particular to FIGS. 1 through 6 thereof, a new alert device embodying the principles and concepts of an embodiment of the disclosure and generally designated by the reference numeral 10 will be described.

As best illustrated in FIGS. 1 through 6, the proximity alert system 10 generally comprises a vehicle 12 that may be driven on a roadway 13. The vehicle 12 may comprise a passenger vehicle or the like. The vehicle 12 has a first lateral side 14, a second lateral side 16, a dashboard 18, a windshield 20, a turn signal 22 and an audible alarm 24. The roadway 13 may comprise a highway having a plurality of lanes.

A proximity alert 26 is coupled to the vehicle 12 and the proximity alert 26 detects obstacles 28 around the vehicle 12 when the vehicle 12 is driven on the roadway 13. The proximity alert 26 is electrically coupled to the turn signal 22. The proximity alert 26 is turned on when the turn signal 22 is actuated. The obstacles 28 may comprise other vehicles driving on the roadway 13.

The proximity alert 26 generates an alarm sequence when the turn signal 22 is actuated and the proximity alert 26 detects the obstacles 28. Thus, the proximity alert 26 may alert a driver of the vehicle 12 to the presence of the obstacles 28 when the vehicle 12 changes lanes on the roadway 13. The proximity alert 26 generates an all clear sequence when the turn signal 22 is actuated and the proximity alert 26 does not detect the obstacles 28. Thus, the proximity alert 26 facilitates the driver to safely change lanes on the roadway 13.

The proximity alert 26 comprises a control 30 that is coupled to the vehicle 12. The control 30 includes a processor 32 that is electrically coupled to the turn signal 22 and the processor 32 is electrically coupled to the vehicle 12. The processor 32 may comprise an electronic processor or the like. An electronic memory 34 is electrically coupled to the processor 32 and the electronic memory 34 stores audio data. The audio data comprises a verbal all clear message and a verbal warning message. The electronic memory 34 may comprise ROM memory or the like.

A pair of cameras 36 is provided and each of the cameras 36 is coupled to the vehicle 12. Thus, each of the cameras 36 monitors an area around the vehicle 12. Each of the cameras 36 is electrically coupled to the control 30 and each of the cameras 36 has a lens 38. The lens 38 is directed away from the vehicle 12 such that each of the cameras 36 captures video footage of the area around the vehicle 12. Each of the cameras 36 may comprise a video camera having night vision capability.

Each of the cameras 36 includes a motion sensor 40. The motion sensor 40 is positioned on the lens 38 such that the motion sensor 40 detects the obstacles 28 when the vehicle 12 is driven on the roadway. The motion sensor may comprise an electronic motion sensor or the like and the motion sensor may have an effective range ranging between approximately fifty cm and five m. Each of the motion sensors is electrically coupled to the processor.

The pair of cameras 36 comprises a first camera 42 and a second camera 44. The first camera 42 is positioned on the first lateral side 14 and the second camera 44 is positioned on the second lateral side 16. The first camera 42 is turned on when the turn signal 22 is actuated to a left turn position. The processor 32 generates the alert sequence when the motion sensor 40 corresponding to the first camera 42 detects the obstacles 28 and the turn signal 22 is actuated to the left turn position. The processor 32 generates the all clear sequence when the motion sensor 40 corresponding to the first camera 42 does not detect the obstacle 28 and the turn signal 22 is actuated to the left turn position.

The second camera 44 is turned on when the turn signal 22 is actuated to a right turn position. The processor 32 generates the alert sequence when the motion sensor 40 corresponding to the second camera 44 detects the obstacles 28 and the turn signal 22 is actuated to the right turn position. The processor 32 generates the all clear sequence when the motion sensor 40 corresponding to the second camera 44 does not detect the obstacles 28 and the turn signal 22 is actuated to the right turn position.

A projector 46 is coupled to the dashboard 18. The projector 46 selectively projects an image onto the windshield 20 and the image is visible to the driver. The projector 46 is electrically coupled to the processor 32. The projector 46 may comprise a video projector or the like. The projector 46 displays the image on the windshield 20 thereby facilitating the driver to view the image without looking away from the windshield 20.

The projector 46 displays the image captured by the cameras 36 when the processor 32 generates the alarm sequence and when the processor 32 generates the all clear sequence. The audible alarm 24 emits the verbal warning message when the processor 32 generates the alarm sequence. The audible alarm 24 emits the verbal all clear message when the processor 32 generates the all clear sequence.

In use, the projector 46 displays the image captured by the first camera 42 and the second camera 44 when the turn signal 22 is actuated to the respective left turn position and the right turn position. The audible alarm 24 emits the verbal warning message when the motion sensor 40 corresponding to the first camera 42 and the second camera 44 detects the obstacles 28 near the vehicle 12. The driver monitors the image on the windshield 20 when the projector 46 projects the image. The driver does not change lanes while the obstacle 28 is adjacent to the vehicle 12. The audible alarm 24 emits the verbal all clear message when the motion sensor 40 corresponding to the first camera 42 and the second camera 44 does not detect the obstacles 28 adjacent to the vehicle 12. The driver executes a lane change when the obstacle 28 is no longer located adjacent the vehicle 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A proximity alert system comprising:
   a vehicle being configured to be driven on a roadway, said vehicle has a first lateral side, a second lateral side, a dashboard, a windshield, a turn signal and an audible alarm; and
   a proximity alert being coupled to said vehicle wherein said proximity alert is configured to detect obstacles around said vehicle when said vehicle is driven on the roadway, said proximity alert being electrically coupled to said turn signal such that said proximity alert is turned on when said turn signal is actuated, said proximity alert generating an alarm sequence when said turn signal is actuated and said proximity alert detects the obstacle wherein said proximity alert is configured to alert a driver of the vehicle to a presence of the obstacles when said vehicle changes lanes on the roadway, said proximity alert generating an all clear sequence when said turn signal is actuated and said proximity alert does not detect the obstacle wherein said proximity alert is configured to facilitate the driver to safely change lanes on the roadway;
   wherein:
   said proximity alert comprises a control being coupled to said vehicle, said control including:
      a processor being electrically coupled to said turn signal, said processor being electrically coupled to said audible alarm;
      an electronic memory being electrically coupled to said processor, said electronic memory storing audio data, said audio data comprising a verbal all clear message and a verbal warning message; and
      a pair of cameras, each of said cameras being coupled to said vehicle wherein each of said cameras is configured to monitor an area around said vehicle, each of said cameras being electrically coupled to said control, each of said cameras having a lens, said lens being directed away from said vehicle wherein each of said cameras is configured to capture video footage of the area around said vehicle; wherein each of said cameras includes a motion sensor, said motion sensor being positioned on said lens wherein said motion sensor is configured to detect the obstacles when said vehicle is driven on the roadway.

2. The system according to claim 1, wherein said pair of cameras comprises a first camera and a second camera, said first camera being positioned on said first lateral side, said second camera being positioned on said second lateral side.

3. The system according to claim 2, wherein said first camera is turned on when said turn signal is actuated to a left turn position, said processor generating said alert sequence when said motion sensor corresponding to said first camera detects the obstacle and said turn signal is actuated to said left turn position, said processor generating said all clear sequence when said first camera does not detect the obstacle and said turn signal is actuated to said left turn position.

4. The system according to claim 2, wherein said second camera is turned on when said turn signal is actuated to a right turn position, said processor generating said alert sequence when said motion sensor corresponding to said second camera detects the obstacle and said turn signal is actuated to said right turn position, said processor generating said all clear sequence when said second camera does not detect the obstacles and said turn signal is actuated to said right turn position.

5. The system according to claim 1, further comprising a projector being coupled to said dashboard, said projector selectively projecting an image onto said windshield wherein said image is configured to be visible to the driver, said projector being electrically coupled to said processor.

6. The system according to claim 5, wherein:

said proximity alert includes a pair of cameras;

said projector displays an image captured by said cameras when said processor generates said alarm sequence and when said processor generates said all clear sequence, said audible alarm emitting said verbal warning message when said processor generates said alarm sequence, said audible alarm emitting said verbal all clear message when said processor generates said all clear sequence.

7. A proximity alert system comprising:

a vehicle being configured to be driven on a roadway, said vehicle having a first lateral side, a second lateral side, a dashboard, a windshield, a turn signal and an audible alarm; and a proximity alert being coupled to said vehicle wherein said proximity alert is configured to detect obstacles around said vehicle when said vehicle is driven on the roadway, said proximity alert being electrically coupled to said turn signal such that said proximity alert is turned on when said turn signal is actuated, said proximity alert generating an alarm sequence when said turn signal is actuated and said proximity alert detects the obstacle wherein said proximity alert is configured to alert a driver of the vehicle to a presence of the obstacles when said vehicle changes lanes on the roadway, said proximity alert generating an all clear sequence when said turn signal is actuated and said proximity alert does not detect the obstacle wherein said proximity alert is configured to facilitate the driver to safely change lanes on the roadway, said proximity alert comprising:

a control being coupled to said vehicle, said control including:

a processor being electrically coupled to said turn signal, said processor being electrically coupled to said audible alarm, and an electronic memory being electrically coupled to said processor, said electronic memory storing audio data, said audio data comprising a verbal all clear message and a warning message, a pair of cameras, each of said cameras being coupled to said vehicle wherein each of said cameras is configured to monitor an area around said vehicle, each of said cameras being electrically coupled to said control, each of said cameras having a lens, said lens being directed away from said vehicle wherein each of said cameras is configured to capture video footage of the area around said vehicle, each of said cameras including a motion sensor, said motion sensor being positioned on said lens wherein said motion sensor is configured to detect the obstacles when said vehicle is driven on the roadway, said pair of cameras comprising a first camera and a second camera, said first camera being positioned on said first lateral side, said second camera being positioned on said second lateral side, said first camera being turned on when said turn signal is actuated to a left turn position, said processor generating said alert sequence when said motion sensor corresponding to said first camera detects the obstacle and said turn signal is actuated to said left turn position, said processor generating said all clear sequence when said first camera does not detect the obstacle and said turn signal is actuated to said left turn position, said second camera being turned on when said turn signal is actuated to a right turn position, said processor generating said alert sequence when said motion sensor corresponding to said second camera detects the obstacle and said turn signal is actuated to said right turn position, said processor generating said all clear sequence when said second camera does not detect the obstacles and said turn signal is actuated to said right turn position, and a projector being coupled to said dashboard, said projector selectively projecting an image onto said windshield wherein said image is configured to be visible to the driver, said projector being electrically coupled to said processor, said projector displaying an image captured by said cameras when said processor generates said alarm sequence and when said processor generates said all clear sequence, said audible alarm emitting said verbal warning message when said processor generates said alarm sequence, said audible alarm emitting said verbal all clear message when said processor generates said all clear sequence.

* * * * *